United States Patent [19]

Cullen

[11] Patent Number: 5,444,939
[45] Date of Patent: Aug. 29, 1995

[54] PLANT TIE FOR INDOOR PLANTS

[76] Inventor: Brian Cullen, P.O. Box 3124, La Grande, Oreg. 97850

[21] Appl. No.: 219,921

[22] Filed: Mar. 30, 1994

[51] Int. Cl.6 ............ A01G 17/06; A01G 17/14
[52] U.S. Cl. ........................... 47/44; 47/43; 24/442
[58] Field of Search .......... 47/43 R, 44 W, 44 L, 47/44 R; 24/306, 442; 128/DIG. 15; 248/205.2

[56] References Cited

U.S. PATENT DOCUMENTS

| | | | |
|---|---|---|---|
| 1,854,627 | 4/1932 | Schweikert | 47/43 R |
| 3,494,071 | 2/1970 | Simmon . | |
| 3,699,959 | 10/1972 | Garrahan et al. | 128/DIG. 15 |
| 3,935,671 | 2/1976 | Soot . | |
| 4,145,840 | 3/1979 | Davidson . | |
| 4,201,013 | 5/1980 | Robbins . | |
| 4,576,664 | 3/1986 | Delahunty . | |
| 5,075,933 | 12/1991 | Kemper | 24/442 |
| 5,129,179 | 7/1992 | Kronmiller | 47/44 L |

FOREIGN PATENT DOCUMENTS

| | | | |
|---|---|---|---|
| 0291868 | 11/1988 | European Pat. Off. | 24/442 |
| 133395 | 8/1929 | Switzerland | 47/44 L |
| 354979 | 7/1961 | Switzerland | 47/44 L |
| 1035 | of 1889 | United Kingdom | 47/44 W |
| 8765 | of 1898 | United Kingdom | 47/44 W |
| 20089 | of 1907 | United Kingdom | 47/44 W |

Primary Examiner—Ramon S. Britts
Assistant Examiner—Joanne C. Downs
Attorney, Agent, or Firm—Dennison, Meserole, Pollack & Scheiner

[57] ABSTRACT

A plant tie including an elongate strip of flaccid or cloth material having flexible cloth fastener elements on the opposed ends thereof for selective engagement with each other to secure the strip about a plant stem. A mounting element is positioned centrally of the strip and includes an enlarged pressure-receiving head engaged with one face of the strip and an elongate pin shaft engaged through the strip and projecting beyond the other face thereof for manually driving into engagement with a wall.

1 Claim, 1 Drawing Sheet

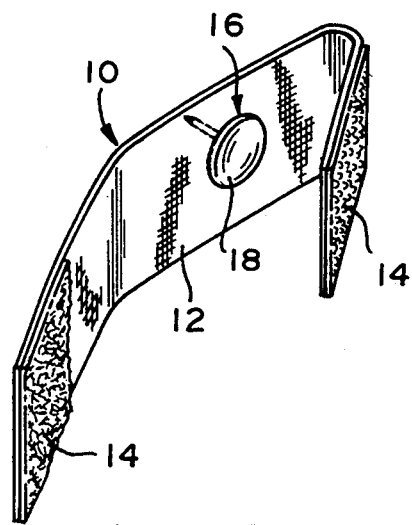
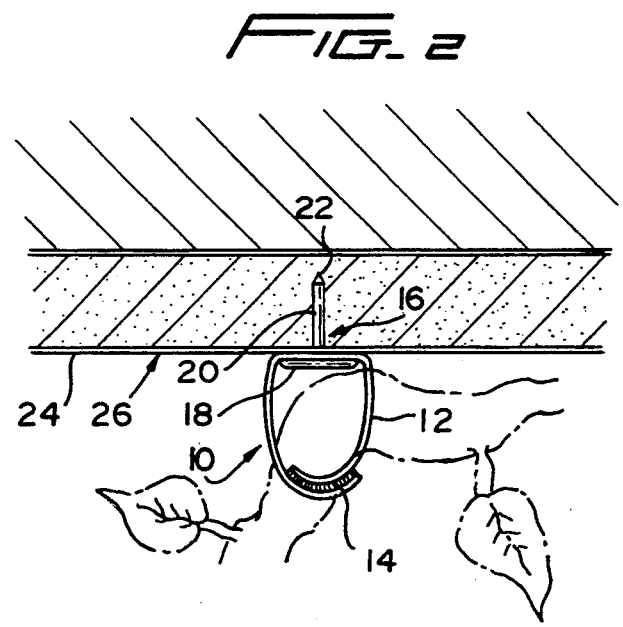
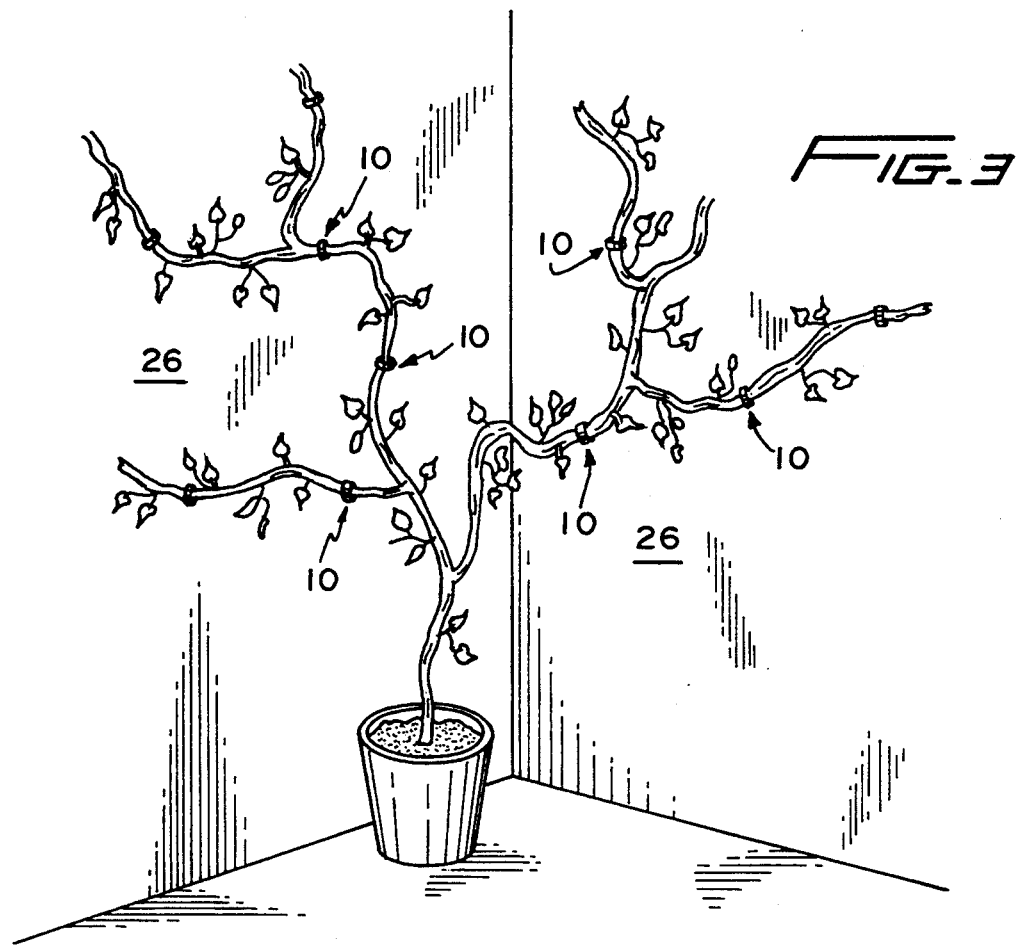

PLANT TIE FOR INDOOR PLANTS

BACKGROUND OF THE INVENTION

The invention is broadly concerned with plant ties, and more particularly ties for indoor or house plants which are normally rather delicate and soft stemmed as compared to more rugged outdoor plants.

While plant ties are generally known, such ties are commonly associated with outdoor plants, vines, and the like of a relatively rugged construction. As such, known ties, while in some instances incorporating flexible members, are of a relatively rigid shape-sustaining nature capable of accommodating relative heavy loads and any adverse weather conditions which might be encountered.

Further, the known ties are frequently provided with rather elaborate means for securing the ties to bricks, block walls and other rather rugged or solid exterior construction materials.

Such outdoor ties will not provide the soft or cushioning bracing required for indoor plants. Further, while selected ones of the known outdoor ties could be secured to interior finished wall surfaces, to do so could cause substantial damage to such surfaces, particularly should one wish to remove or reposition the ties. For example, in one known outdoor tie, the tie is affixed to the surface by an adhesive. The mounting of such a tie on sheet rock, wood panelling, or the like would substantially preclude their subsequent removal in light of the noticeable blemishes, or worse damage which could result therefrom.

SUMMARY OF THE INVENTION

The plant tie of the present invention is particularly adapted for use with indoor plants in an in-house environment wherein there is particular concern with the protection of rather delicate, that is easily damaged, plants, as well as the accommodation of the tie to a finished interior wall surface without damage thereto, particularly where removal of the tie for relocation or the like is necessary.

In conjunction with the non-damaging support of the plant or plant portion such as stem, it is also significant that the plant tie actually accommodate itself or conform to the engaged portion of the plant automatically and in a manner which will continue to effect a positive support even should there be a slight shifting in the plant, for example as the plant grows.

Other features of significance with regard to the plant tie reside in a particular ease in which the tie can mount in a non-damaging way to a wall surface, the ease in which the tie can encircle and be adjusted to a plant member, and the ease in which the tie can be removed, as for example for repositioning.

The advantages of the invention are achieved by a tie formed of an elongate strip of flaccid material. That is of cloth, fabric or the like material which is soft and without the shape sustaining properties found in bendable wire, flexibly resilient plastic strips and like materials normally associated with outdoor plant ties. It is intended that the word flaccid, as used herein, describe the "limp" material of the tie.

This material is provided in an elongate flat strip with the opposed ends thereof mounting flexible hook and loop fasteners, commercially known as Velcro ® for a releasable securing of the ends of the strip upon an encircling of the plant or plant portion. The cloth nature of the fasteners continues the flaccid nature of the strip itself.

In order to secure the strip to a wall surface, a mounting element is provided generally centrally along the strip. This element includes an enlarged pressure head with a thin pin-like shaft extending therefrom and terminating in a penetrating point. The shaft is extended through the flaccid material with the head bearing against one face of the strip and the shaft projecting beyond the other face thereof whereby, upon finger or thumb pressure on the head, the shaft, with the leading penetrating point, can be driven into a wall surface. Utilizing such mounting means, only a single small hole is formed in securing the tie. Such a hole would, for all practical purposes, be indistinguishable even on a finished surface should it be necessary to remove or reposition the tie. By the same token, the provision of an enlarged head on the mounting element, particularly when dealing with rather soft interior surfaces as opposed to exterior brick, block, and the like, enables a mounting of the pin manually, that is without tools and only relying on thumb or finger pressure.

Additional features and advantages of the invention will become apparent from the more detailed description of the invention following hereinafter.

BRIEF DESCRIPTION OF THE DRAWINGS

FIG. 1 is a perspective view of the plant tie prior to mounting;

FIG. 2 is a top plan view of the tie mounted to a wall and encircling a plant stem; and FIG. 3 is an environmental illustration of multiple plant ties supporting a growing vine.

DESCRIPTION OF PREFERRED EMBODIMENT

Referring now more specifically to the drawings, the plant tie 10 is comprised of three components, an elongate flat strip 12 of flaccid material, a fastener for the opposed ends of the strip 12 consisting of cooperating fastener elements 14, and a mount 16 centrally engaged with the strip 12.

The flaccid strip 12, preferably having a width of between one-half inch and three-quarters inch to provide a wide area of support, can be of any reasonable length depending upon the plant material to be encircled. For example, when supporting the stem of a creeping vine, a strip of approximately two and three-quarter inches can be used. Should it be necessary to support multiple vines or bunches of plants, the strips can appropriately be made longer.

The strip is soft and preferably of cloth to encircle and conform to a plant portion, noting FIG. 2, as the plant portion is engaged and supported.

The fastener ends 14, in order to continue the flaccid nature of the strip 12, are preferably cloth-type fasteners utilizing inter-engaging flexible hooks and loops, for example of the commercial type sold as Velcro ®. These cloth fasteners can be sewn or adhesively secured to the strip end portions and allow for a degree of adjustability with regard to the end overlaps.

The mounting element 16 includes an enlarged pressure head 18, that is a head capable of accommodating thumb pressure or the like for a driving of this element. An elongate pin shaft 20 is rigid with and extends axially from the head 18 terminating in a penetrating point 22. The shaft 20 is engaged centrally through the strip 12 with the head 18 engaging flush against one face of the strip and the pin projecting laterally beyond the other face of the strip. So arranged, and noting FIG. 2, the plant tie can be easily mounted to the interior surface 24 of a wall 26 of wall board, panelling, or the like, by the exertion of a manual force as by a thumb, on the enlarged head 18 driving the pointed shaft 20 into the wall and affixing the flaccid strip 12 for subsequent engagement about a plant or plant portion positioned thereto.

With the fastener elements engaged, the weight of the encircled plant portion 28, noting FIG. 2, will pull on the flaccid material which, in the nature of cloth, is preferably either not extendible or only minimally extendible, and will cause the strip to closely conform to a major portion of the surface of the plant, thus providing a positive non-damaging confining of the plant in a highly protective manner.

The foregoing is illustrative of the invention, and it is intended that the scope of the invention be such as to encompass all embodiments which may occur to one skilled in the art.

I claim:

1. A plant tie for the stabilization and support of delicate and soft stemmed house plants in combination with a plant, said tie comprising an elongate strip of flaccid cloth, said strip encircling a portion of a stem of said plant in a closed loop for the support thereof, said strip having opposed ends, cooperating fastener means in the form of flexible hooks and loops on said opposed ends adjustably and releasably securing said ends to each other to form said closed loop, and mounting means located substantially midway between said opposed end for securing said tie to an interior support surface, said mounting means comprising a single fastener having a head portion engaged with said strip for clamping a portion of said strip against said surface, said head portion presenting an enlarged area for accommodating a user's finger or thumb thereagainst, and an elongate, thin pin-like shaft fixed to said head portion and projecting through said strip generally laterally from a face thereof for insertion into said support surface upon finger or thumb pressure engagement against said head portion to secure said tie to the surface, said mounting means being manually removable and repositionable.

* * * * *

UNITED STATES PATENT AND TRADEMARK OFFICE
CERTIFICATE OF CORRECTION

PATENT NO. : 5,444,939
DATED : August 29, 1995
INVENTOR(S) : Brian CULLEN

It is certified that error appears in the above-indentified patent and that said Letters Patent is hereby corrected as shown below:

Column 4, line 11, "end" should read --ends--.

Signed and Sealed this

Fourteenth Day of November, 1995

Attest:

BRUCE LEHMAN

*Attesting Officer*      *Commissioner of Patents and Trademarks*